United States Patent [19]

Lee et al.

[11] Patent Number: 4,513,299

[45] Date of Patent: Apr. 23, 1985

[54] SPOT SIZE MODULATION USING MULTIPLE PULSE RESONANCE DROP EJECTION

[75] Inventors: Francis C. Lee, San Jose, Calif.; Ross N. Mills, Boulder, Colo.; Robert N. Payne, San Jose; Frank E. Talke, Morgan Hill, both of Calif.

[73] Assignee: International Business Machines Corporation, Armonk, N.Y.

[21] Appl. No.: 562,302

[22] Filed: Dec. 16, 1983

[51] Int. Cl.[3] .......... G01D 15/18

[52] U.S. Cl. .......... 346/140 R

[58] Field of Search .......... 346/140 R, 1.1, 75

[56] References Cited

U.S. PATENT DOCUMENTS

| | | | |
|---|---|---|---|
| 3,834,301 | 9/1974 | Croquelois et al. | 101/1 |
| 3,846,800 | 11/1974 | Chen | 346/75 X |
| 3,946,398 | 3/1976 | Kyser et al. | 346/1.1 |
| 4,018,383 | 4/1977 | Paton et al. | 239/4 |
| 4,047,183 | 9/1977 | Taub | 346/1 |
| 4,222,060 | 9/1980 | Sato et al. | 346/140 R |
| 4,281,333 | 7/1981 | Tsuzuki et al. | 346/140 R |
| 4,353,078 | 10/1982 | Lee | 346/140 R |
| 4,468,679 | 8/1984 | Suga | 346/140 R |

*Primary Examiner*—Joseph W. Hartary
*Attorney, Agent, or Firm*—Otto Schmid, Jr.

[57] ABSTRACT

An ink jet drop-on-demand printing system comprising an ink jet print head having an ink cavity supplied with a suitable ink. An electromechanical transducer is mounted in mechanical communication with the ink cavity, and a source of electrical signals is provided to selectively actuate the transducer to produce an ink drop of a selected size. To produce ink drops of a selected size the source of electrical signals produces one or more electrical drive signals each separated by a fixed time delay which is short with respect to the drop-on-demand drop production rate. Each electrical drive signal ejects a predetermined volume of ink and all the volumes of ink merge to form a single drop prior to the time the ink drops reach the print medium for printing.

5 Claims, 9 Drawing Figures

I .D. 96162-56-JPTF I BM DOD I NK JET-I NK TEST
OPQRSTUVWXYZ0123456789!"#$%&(')*+/<=>?@:;[___[ [illegible] ]___
WNMWNDTLMWNFTEBMWNDTLMWNFTEBMWNDTLMWNFTEBMWNDTL
I .D. 96162-56-JPTF I BM DOD I NK JET-I NK TEST
OPQRSTUVWXYZ0123456789!"#$%&(')*+/<=>?@:;[___[ [illegible] ]___
WNMWNDTLMWNFTEBMWNDTLMWNFTEBMWNDTLMWNFTEBMWNDTL

SPOT SIZE MODULATION USING MULTIPLE PULSE RESONANCE DROP EJECTION

DESCRIPTION

BACKGROUND OF THE INVENTION

1. Field of the Invention

This invention relates to an improved ink jet printing apparatus and for generating ink drops on demand having selectively variable size.

2. Description of the Prior Art

There have been known in the prior art ink jet printing systems in which a transducer is selectively energized to produce ink drops on demand. Extensive efforts have been made to improve reliability and enhance the print quality and resolution of drop-on-demand ink jet printing systems.

Dot matrix printing at a resolution of 240 pels per inch produces printing that approaches the print quality produced by engraved type. A spot size of 125 to 150 $\mu$m is generally needed to give full area fill at a resolution of 240 pels per inch. For most commercially available papers, a spot size of 125 to 150 $\mu$m requires that the nozzle diameter be of the order of 50 to 75 $\mu$m.

Surface tension forces are indirectly proportional to the nozzle radius, so from this relationship it is apparent that a decrease in the nozzle dimension will increase the reliability of the drop generator as long as the nozzle does not clog. For most nozzle designs, the optimum reliability is obtained with nozzles having a diameter of the order of 30 to 50 $\mu$m. Thus, in general, in order to simultaneously optimize print quality and reliability, it is desirable to obtain the maximum drop volume using the smallest nozzle for which clogging does not occur. However, for printing systems which require high quality printing, it is recognized that, to obtain these desirable characteristics, incompatible requirements are presented.

There have been attempts in prior art printing systems to produce larger than normal drops in the drop-on-demand mode from a nozzle of a particular size. One such system is disclosed in U.S. Pat. No. 3,946,398 in which the volume of ink in each drop is varied by adjusting the magnitude of the drive voltage pulse. Another system is disclosed in U.S. Pat. No. 4,281,331 to Tsuzuki et al in which the energy content of the transducer driving pulse determines the size of the ink drop.

In some cases systems of the above-described type produce drops having a variation in drop velocity along with the change in drop size which degrades print quality. Compensation for this variation in velocity has been attempted in U.S. Pat. No. 4,222,060 to Sato et al by varying not only the amplitude but also the effective timing of each of the voltage drive pulses so that the resulting ink drops reach the print medium at the desired location. This compensation method requires complex control circuits which are difficult to modify to include future improvements.

Another system is described in the commonly assigned copending application entitled "Gray Scale Printing With Ink Jet Drop-On-Demand Printing Head" by F. C. Lee et al, Ser. No. 413,039, filed Aug. 30, 1983, in which the transducer comprises a plurality of separately actuable sections. Control means is provided which is operable in response to the print data to selectively actuate a particular combination of one or more of the separately actuable sections of the transducer to produce an ink drop of one of a plurality of sizes as specified by the print data.

SUMMARY OF THE INVENTION

It is therefore the principal object of this invention to provide an improved drop-on-demand printing system in which ink drops having selectively variable size are generated and utilized for printing.

Briefly, according to the invention, there is provided a drop-on-demand ink jet printing apparatus comprising an ink jet print head having an ink cavity supplied with a suitable ink. An electromechanical transducer is mounted in mechanical communication with the ink cavity, and a source of electrical drive signals, repeatable at a predetermined drop-on-demand drop production rate, is provided to selectively actuate the electromechanical transducer to eject a single drop of ink having a predetermined size for each of the electrical drive signals. Means are also provided for selectively producing at least one additional electrical drive signal with a fixed time delay, relative to the immediately preceding electrical drive signal, and this fixed time delay is short with respect to the drop-on-demand drop production rate. The electromechanical transducer is also actuated with the additional electrical drive signals to eject an additional predetermined quantity of ink, with each of the quantities of ink merging into a single drop of ink prior to the time the drop reaches the print medium for printing so that each ink drop can be produced having a selected one of a plurality of possible drop sizes.

The foregoing and other objects, features and advantages of the invention will be apparent from the following more particular description of a preferred embodiment of the invention as illustrated in the accompanying drawings.

DESCRIPTION OF THE PREFERRED EMBODIMENTS

Figure 1:
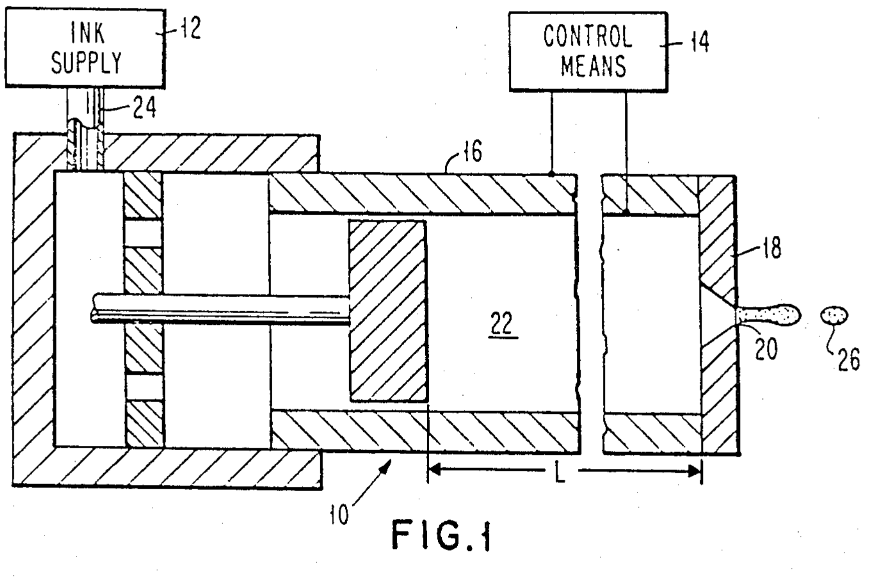
FIG. 1 is a diagrammatic schematic view of a specific embodiment of the drop-on-demand ink jet printing system embodying the invention.
Figure 2:
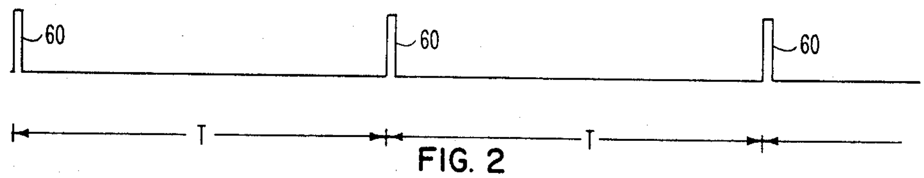
FIG. 2 is a diagram showing the voltage drive pulses for operation of the drop-on-demand ink jet printing system of FIG. 1 having a single ink drop size.

Referring to FIG. 1, the printer apparatus comprises a print head 10 to which is supplied liquid ink from ink supply means 12. Control means 14 provides the signals to control the printer apparatus including voltage control pulses to selectively energize print head 10 to produce one ink drop for each voltage pulse supplied to print head 10. In the embodiment shown in the drawing, print head 10 comprises a hollow cylindrical transducer member 16 closed at one end by a nozzle plate 18 to form a chamber of cavity 22 therein. Print head 10 could as well be any of the other impulse drop-on-demand print heads known in the art. Cavity 22 is maintained filled with ink through supply line 24 from ink supply means 12. Ink from supply means 12 is not pressurized so the ink in cavity 22 is maintained at or near atmosphere pressure under static conditions. An exit from cavity 22 is provided by nozzle portion 20 which is designed in conjunction with ink supply means 12 so that the ink does not flow out of, or air flow into, nozzle portion 20 under static conditions. Transducer 16 displaces radially when energized with a suitable voltage pulse, and produces a pressure wave in cavity 22 so that liquid ink is expelled out through nozzle portion 20 to form a single ink drop 26. Control means 14 provides the voltage drive pulses 60 (see FIG. 2) to selectively energize transducer 16 to produce one ink drop 26 for each suitable voltage pulse applied to transducer 16. Although only one transducer is described it will be recognized by those skilled in the art than an array of transducer can be used, if desired.

During printing, print head 10 is traversed across the print medium at a substantially constant velocity and character bit data is generated by control means 14 in synchronism with the print head 10 movement. As is known in the art, in drop-on-demand (DOD) printing, ink drops are produced by controlling the voltage drive to transducer 16. A selected voltage drive pulse 60 is produced (see FIG. 2) at each of the drop production times T for which an ink drop is required for printing, and no voltage drive pulse 60 is produced at intervals T in which no drop is required for printing. In this manner, drops can be formed at selected intervals T responsive to the character bit data to produce the desired print data on the print medium. The apparatus for providing the synchronized movement of print head 10 is known in the art, so that apparatus is not described here since detailed knowledge of that apparatus is not required for an understanding of the invention.

According to the invention, printing apparatus is provided which produces ink drops of selectively varying volume at constant velocity. The constant velocity is necessary since the print head 10 is moving at a constant velocity during printing and any variation in drop velocity would cause displacement from the desired print position which causes distortion and degradation of print quality. The different drop volumes available provide the option to operate the same printer in several different modes. For example, the drop volume can be selected to provide optimum full area fill to produce high resolution printing. On the other hand, by using only larger drops on a coarser matrix, a draft-mode print quality can be chosen. The printer would also be useful in any applications requiring half tone images, including control of color saturation hue and lightness.

Figures 8, 9:
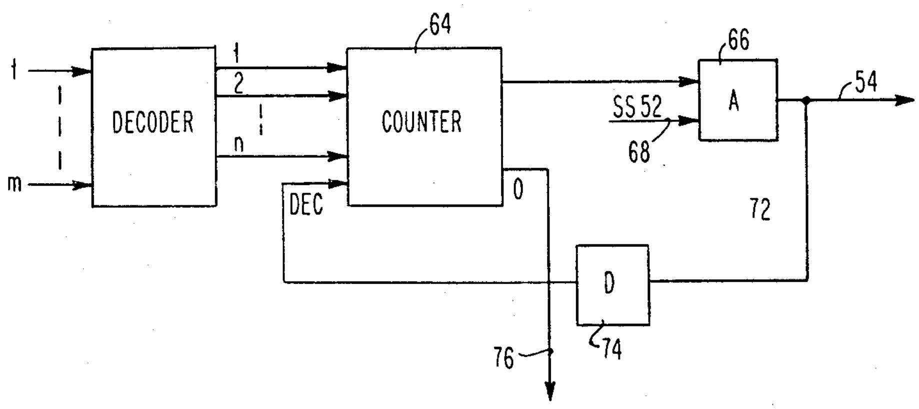
FIG. 8 is a schematic block diagram of the part of the control means of FIG. 7 directed to selection of drop size in accordance with the present invention.
FIG. 9 is a print sample printed in accordance with the invention at a resolution of 240 pels per inch and a drop-on-demand drop production rate of 5 KHz.

One example of printing according to the invention is shown in FIG. 9. FIG. 9 is a print sample printed at a resolution of 240 pels per inch and at a drop-on-demand drop production rate of 5 KHz. The top three lines in FIG. 9 are printed with two voltage drive pulses 60 per pel. In the bottom three lines, the same data is printed with a single voltage drive pulse 60 per pel. This print sample shows the effect of a change in the drop size only as it affects the appearance of the printed text.

Figure 3:
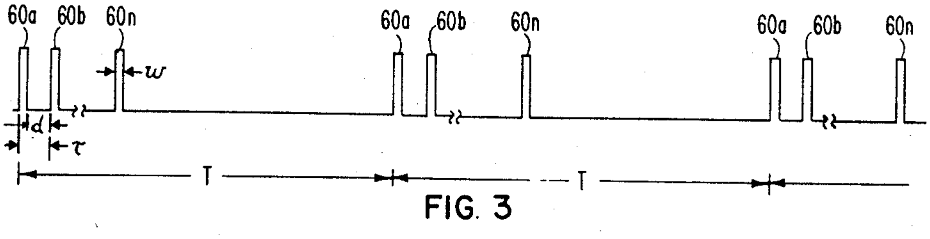
FIG. 3 is a diagram showing the voltage drive pulses for drop-on-demand operation of the drop-on-demand ink jet printing system of FIG. 1 in accordance with the present invention in which n ink drop sizes can be selectively produced.

Generally speaking, a plurality n of different size ink drops is produced by selectively providing a plurality of voltage drive pulses *60a–60n* each spaced by a predetermined time which is small compared to the DOD drop production time T. As shown in FIG. 3, a typical voltage drive pulse *60a* having a selected amplitude and pulse width is shown which, when used to energize transducer 16, is operable to produce an ink drop 26 having one unit of volume. In addition, ink drops having further units of volume can be produced for any selected ink drop by having one or more subsequent voltage drive pulses *60a–60n* each of which follows the preceding voltage drive pulse 60 by a predetermined delay time d. It is apparent that the pulse spacing $\tau$=pulse width w+delay time d. The voltage drive pulses are chosen to have a suitable amplitude and a pulse width which enhances the drop formation process. The voltage drive pulses preferably have a pulse width w determined by the relation L/a where L is the length of the ink cavity 22 and a is the velocity of sound in the ink. The predetermined delay time d between pulses is also chosen to enhance the drop formation process. The timing of 2L/a results in reinforcement of the original pulse reflection at the meniscus which amounts to a resonance mode operation for the embodiment shown. A timing d at or near resonance is preferred such as a timing chosen to be approximately 1.5 to 2L/a.

Figure 4:
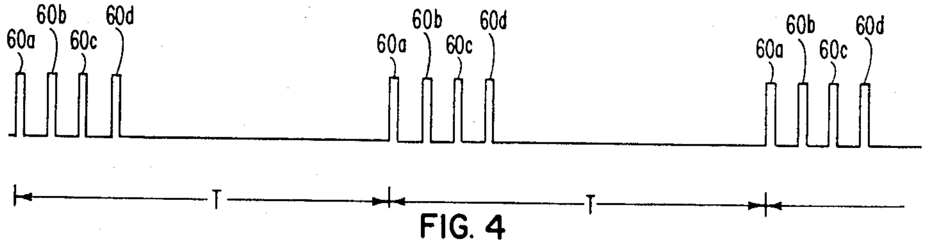
FIG. 4 is a diagram showing the voltage drive pulses for the specific embodiment of the present invention in which four drop sizes can be selectively produced.
Figure 5:
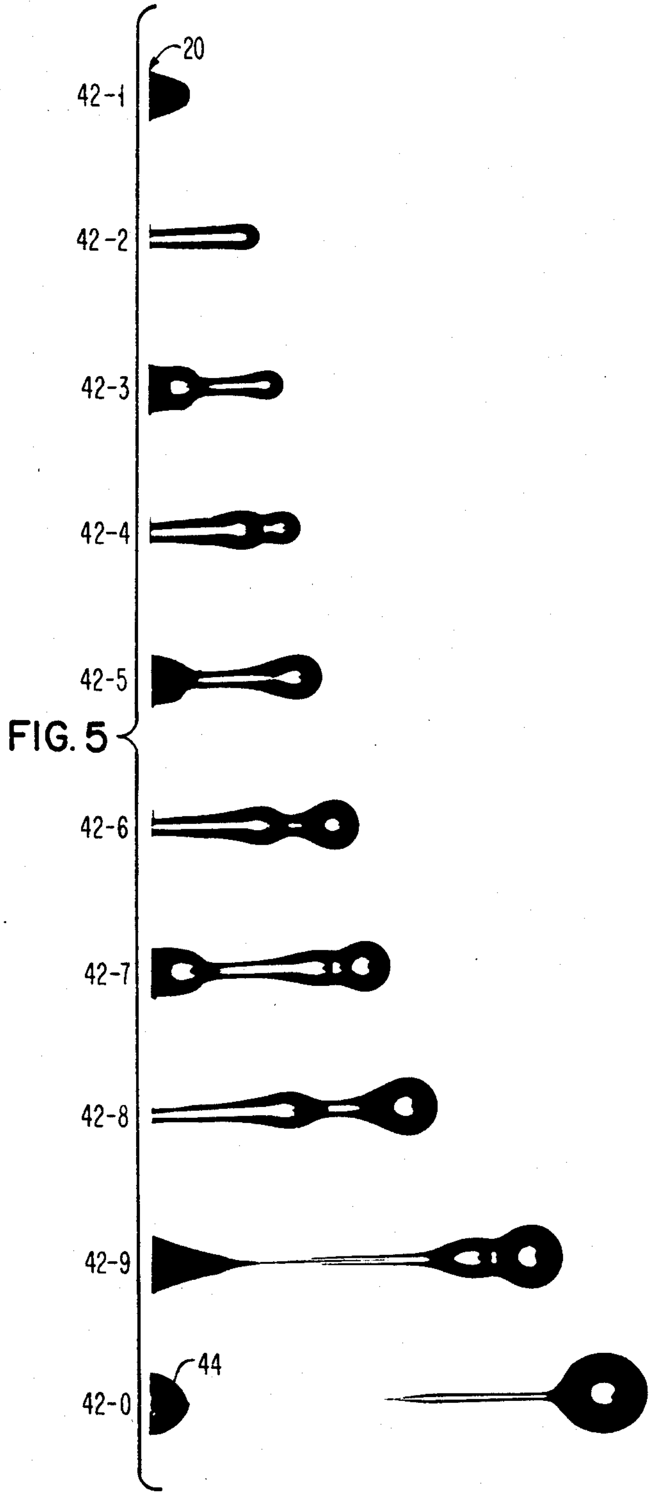
FIG. 5 is a sketch showing a series of high speed images, at selected intervals in the drop formation process, of the meniscus and the ink that is ejected from the nozzle in response to the voltage drive pulses shown in FIG. 4.

For this mode of operation, the drop formation process is substantially different from the process involved in the normal DOD drop formation process. This mode of operation can be understood by referring to FIGS. 4 and 5, in which four voltage drive pulses *60a–60d* are selectively utilized to produce an ink drop. The voltage drive pulses *60a–60d* are coupled to drive transducer 16, and the resultant action can be observed by referring to FIG. 5. FIG. 5 is a sketch showing a series of high speed images at selected intervals in the drop formation process of the meniscus, and the ink that is ejected from nozzle portion 20 in response to drive pulses *60a* through *60d*. A first volume of ink is ejected from the nozzle 20 in response to drive pulse *60a* as can be seen in image 42-1. This volume of ink continues to move toward the print medium as is shown in image 42-2. It can be observed in image 42-3 that the second strong pressure wave produced in response to drive pulse *60b* causes a second volume of ink to be ejected from nozzle 20. It can be observed in image 42-4 that the second volume of ink is ejected at a higher velocity due to the different boundary conditions, and for this reason it catches up with the first volume of ink and merges into a single drop of ink. The volume of the ink drop obtained in this way is approximately twice the volume of a single ink drop such as a drop formed by voltage drive pulse 60 alone. Should only two pulses *60a* and *60b* be present, then this size drop would continue until drop break-off occurs so that an ink drop having about two units of volume would be projected to the record medium for printing.

If additional voltage drive pulses of the same amplitude and pulse width are provided, the multiple wave cycles each produce unit volumes of ink which merge into a single drop of substantially larger volume. Continuing with the example shown in FIGS. 4 and 5, images 42-5 and 42-6 show the third volume of ink ejected in response to drive pulse 60*c*, and images 42-7 and 42-8 show the fourth volume of ink ejected in response to drive pulse 60*d*. Image 42-9 shows the continuing flight of the four ink volumes and image 42-0 shows that the four volumes of ink merge into one drop having 4 units of volume prior to break-off from the meniscus 44.

Figure 6:
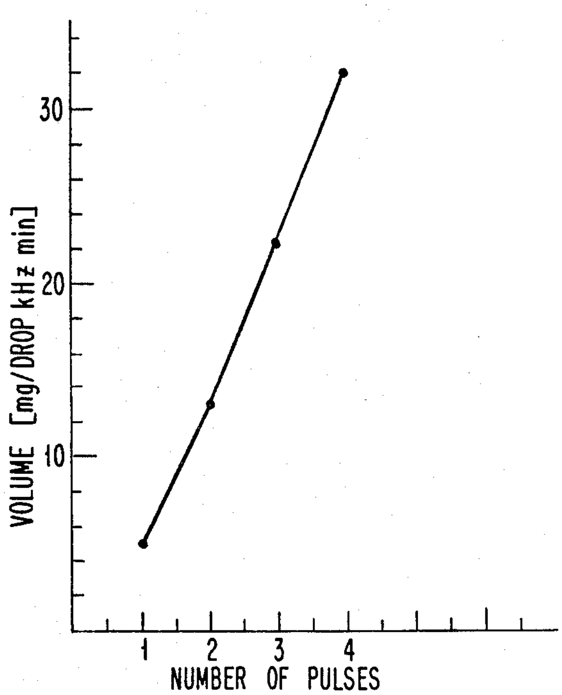
FIG. 6 is a plot showing drop volume versus number n of voltage drive pulses 60.

This relationship is confirmed in the data shown in FIG. 6.

FIG. 6 shows that each added voltage drive pulse 60 adds an approximately equal volume of ink to the resulting ink drop. We have obtained drop volumes of up to 6 times that of the drop volume produced by a single voltage drive pulse, and there is no reason, in principle, why even higher values of n cannot be used. However it should be recognized that, for higher values of n, there is a tradeoff between drop size and drop-on-demand drop production rate since the successive increments of $\tau$ may approach the value T. In this case, to maintain reliable operation, it is necessary to increase the DOD drop production time T which reduces the DOD drop production rate.

Control means 14 may comprise any suitable means for accepting the data to be printed, which is usually in coded form, generating the bit patterns to produce the print data in the desired format, and producing the drive pulses to control transducer 16 to produce the desired print imaage on the record medium. Control means 14 may comprise hard wired logic circuits or this control may be provided by the processor of a data processing system of which the printer is a part. In addition, control means 14 may comprise a microcomputer which provides voltage drive pulses as well as other control functions for the printer. Other data sources, such as non-coded information data can also be printed.

Figure 7:
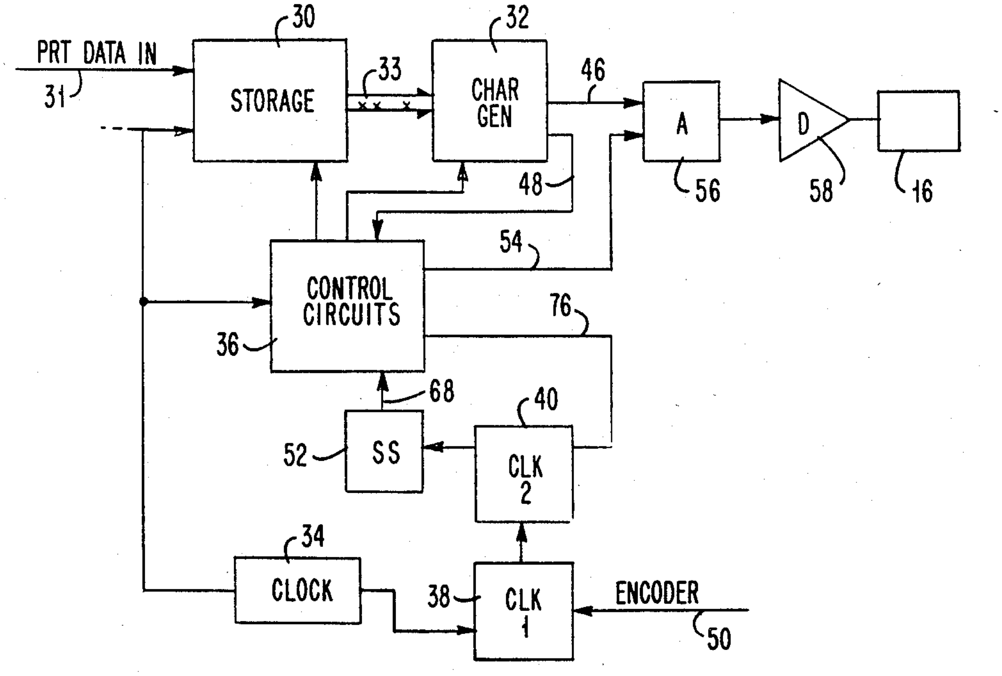
FIG. 7 is a schematic block diagram of one embodiment of the control means for controlling the printing system embodying the present invention.

Referring to FIG. 7, the embodiment of control means 14 shown comprises a storage device 30, a character generator 32, a clock pulse generator 34 and sequencing and control circuit 36. Storage device 30 functions to store the print data and the desired character fonts. Character generator 32 produces the appropriate bit pattern data and the drop size data which controls the size of each ink drop to be produced. Clock pulse generator 34 produces timing pulses to define cycles for storage device 30, character generator 32, and to synchronize other components of the system. These clock pulses may be derived from a system clock, if desired, and if so, the system clock pulses may be divided to produce pulses of the desired frequency. A pulse generator 38 is provided to generate signals CLK 1 to define the drop-on-demand drop production interval T. Pulse generator 38 receives as input a pulse train having a frequent proportional to the velocity of movement of print head 10 which is a substantially constant velocity during printing. The pulse train is usually generated by a position encoder associated with the moving print head as is known in the art. A second clock pulse source 40 is provided which produces pulses CLK 2 at a fixed frequency chosen to define the timing $\tau$ between successive multiple voltage drive pulses. If desired, the clock pulses from source 40 may be derived from a system clock or from clock pulse generator 34, and, if so, the received clock pulses may be divided to produce the pulses CLK 2 of the desired frequency.

In operation, the data to be printed is sent to storage device 30 on line 31, and this data is read out to character generator 32 over lines 33 when the data is to be printed as specified by signals from control circuits 36. Character generator 32 produces a data output on line 46, so that line 46 is at an up level when a dot is to be printed at a particular interval T or the line 46 is at a down level when no dot is to be printed. Character generator 32 also produces m bits of drop size data on line 48 which is coupled to control circuits 36. The m bits of drop size data are sufficient to specify n drop size levels, so in the case shown in FIGS. 4 and 5 for four drop size levels, two bits of drop size data are required.

The pulse generator 38 receives the printer carriage encoder data on line 50 and produces an output comprising pulses which have a repetition rate equal to the drop production period T. These pulses are synchronized with the print head movement and these pulses are coupled to turn ON clock pulse generator 40 which produces output pulses CLK 2 at a repetition frequency equal to the chosen timing $\tau$ to define the timing between successive multiple voltage drive pulses 60*a*–60*n*. In the specific embodiment illustrated in FIG. 4, this timing $\tau$ would be chosen by 3L/a. Each of the signals CLK 2 turns ON Single Shot Multivibrator 52 to produce an output pulse, the pulse width w of which is equal to the chosen width of the voltage drive pulses, and in the specific example of FIG. 4, this timing w is chosen as L/a.

The output of Single Shot 52 therefore comprises a series of pulses having a pulse width defined by the Single Shot period and a repetition rate defined by the signal CLK 2. The output of Single Shot Multivibrator 52 is coupled to control circuits 36. The m size bits of data are decoded in control circuits 36 and a corresponding number n of pulses from Single Shot 52 are gated out on line 54 to provide one input to AND circuit 56. The data bit from character generator 32 provides the other input to AND circuit 32. When the data indicates that a dot is to be printed during the current period T an up level is present on line 46 so this up level is present during each of the pulses on line 54 to condition AND circuit 56 during those pulses. Therefore driver 58 is energized with the n pulses to drive transducer 16 to produce a drop of ink having a size produced by n increments of volume. Should an array of transducers be used the circuit comprising AND circuit 46 and driver 58 would be included to control each transducer 16 in response to data from character generator 32 for each specific transducer.

A specific example of the part of control circuits 14 which provide the decode and drive voltage pulse generation functions is shown in FIG. 8. The m bits of size data are coupled on line 48 to decoder 70. The m bits of data are decoded to produce a count n on lines 62. The count n is loaded broadside into counter 64 and the output of counter 64 is coupled to provide one input of AND circuit 66. The second input to AND circuit 66 is provided on line 68 from Single Shot Multivibrator 52. Each time an output pulse from single shot 52 is present, and a non-zero count is present in counter 64, AND circuit 66 is conditioned to produce an output pulse on line 54. The output of AND circuit 66 is also coupled over line 72 through short delay 74 to decrement the count in counter 64 by one count. This operation continues until the count in counter 64 reaches zero at which time the output line of counter 64 goes down thereby deconditioning AND circuit 66. At the same time an output on line 76 designates that a count=0 is in the counter. The signal on line 76 is utilized to set clock pulse generator 40 OFF. This operation results in n pulses being coupled to energize transducer 16 which are spaced apart by a time period $\tau$ which is short with respect to the drop production time T.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. A drop-on-demand ink jet printing system comprising an ink jet head having an ink cavity, an orifice communicating with said ink cavity, and an electromechanical transducer mounted in mechanical communication with said ink cavity, a source of electrical drive signals repeatable at a predetermined drop-on-demand drop production rate, and means to selectively actuate said electromechanical transducer in response to said electrical drive signals to force a single drop of ink from said orifice; the improvement comprising;

means for selectively producing at least one additional electrical drive signal each with a fixed time delay with respect to the immediately preceding electrical drive signal, said fixed time delay being short with respect to said drop-on-demand drop production rate; and means to actuate said electromechanical transducer with each of said electrical drive signals to produce a quantity of ink having a predetermined volume from said orifice, said quantities of ink merging into a single drop of ink prior to the time the drop reaches the print medium for printing whereby each ink drop can be produced having a selected one of a plurality of possible drop sizes.

2. The drop-on-demand ink jet printing system of claim 1 in which said electrical drive signals have a pulse width of L/a where L is the length of said ink cavity and a is the velocity of sound in said ink.

3. The drop-on-demand ink jet printing system of claim 1 in which said fixed time delay is about 1.5 to 2 L/a where L is the length of said ink cavity and a is the velocity of sound in said ink.

4. The drop-on-demand ink jet printing system of claim 1 in which all of said quantities of ink having a predetermined volume merge into a single drop prior to break-off of the ink drop of the selected size.

5. The drop-on-demand ink jet printing system of claim 1 in which the size of said orifice is within the range of from about 30 to about 50 micro-meters.

* * * * *